United States Patent [19]
Patsch et al.

[11] 3,742,307
[45] June 26, 1973

[54] BIN LEVEL INDICATOR

[75] Inventors: Thomas E. Patsch, Aurora; Robert E. Farnham, Naperville, both of Ill.

[73] Assignee: Barber-Greene Company, Aurora, Ill.

[22] Filed: Mar. 1, 1972

[21] Appl. No.: 230,754

[52] U.S. Cl. .................. 318/482, 73/321, 33/126.6
[51] Int. Cl. ............................................. G01f 23/00
[58] Field of Search .................. 318/482; 33/126.6; 73/321

[56] References Cited
UNITED STATES PATENTS

| | | | |
|---|---|---|---|
| 2,352,080 | 6/1944 | Crowley, Jr. | 33/126.6 |
| 2,704,401 | 3/1955 | Mohr, Jr. et al. | 33/126.6 |
| 2,854,752 | 10/1958 | Heacock | 33/126.6 |
| 3,128,557 | 4/1964 | Childs | 33/126.6 |
| 3,400,462 | 9/1968 | Pobst | 33/126.6 |
| 3,140,610 | 7/1964 | Lanham | 73/321 |
| 3,521,367 | 7/1970 | Grynovich et al. | 73/321 X |

*Primary Examiner*—Benjamin Dobeck
*Attorney*—McDougall, Hersh & Scott

[57] ABSTRACT

A reversible electric motor powers a drum through a drive train including a clutch. A weight is suspended from a length of cable, the latter being wound on the drum. The clutch is sensitive to the effect of the weight thereby to cause the drum to be rotated for unwinding the cable only when the weight is freely suspended. Indicator means including a potentiometer is responsive to rotation of the drum. A control circuit including timing means cyclically energizes the motor in up and down directions, the duration of time in the down direction of each cycle being greater than the duration of time in the up direction so as to cause the weight to be lowered a distance greater than the distance it is raised during each cycle of operation whereby the weight is in effect incrementally lowered to seek the level of material in the bin.

6 Claims, 3 Drawing Figures

PATENTED JUN 26 1973
3,742,307
SHEET 1 OF 2
Fig. 1
Fig. 2
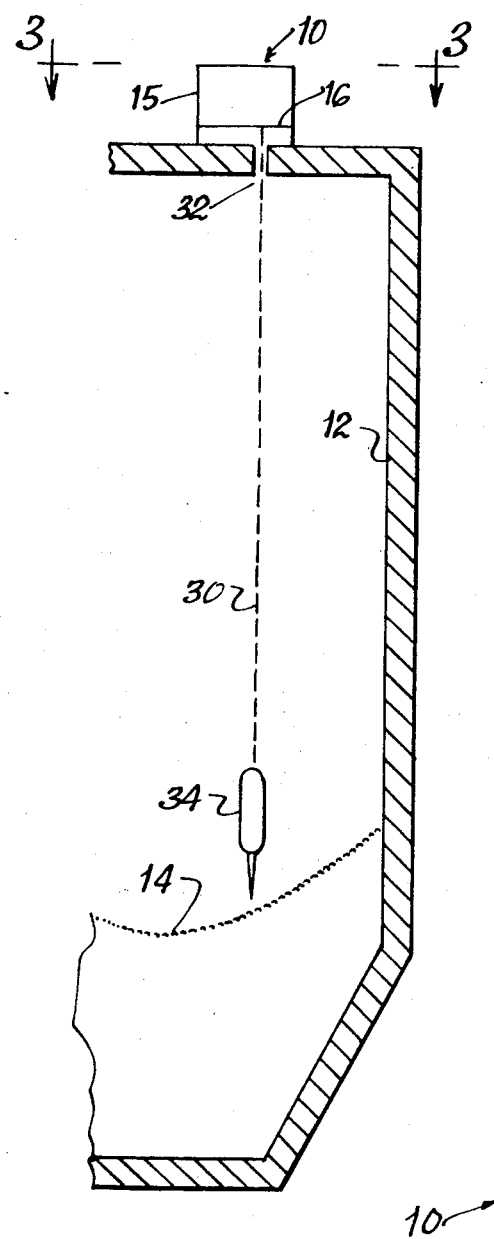
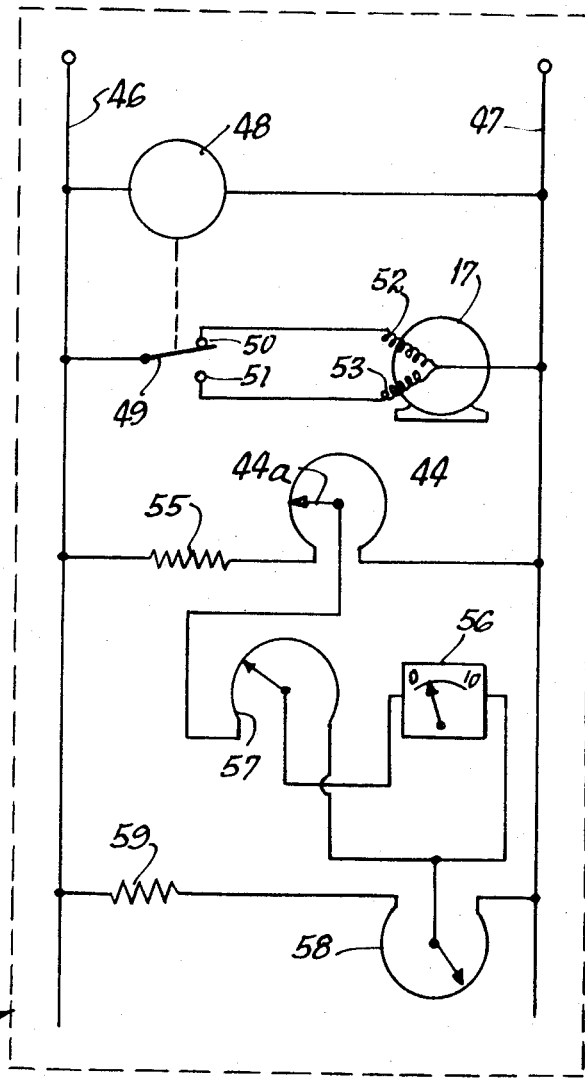

BIN LEVEL INDICATOR

BACKGROUND OF THE INVENTION

1. Field of the Invention

The present invention relates to mechanism for indicating the level of material in a bin or the like. In particular, the present invention relates to an indicator of the type described which is adapted to provide the operator with a visual indication of the level of material in the bin on a substantially continuous basis.

2. The Prior Art

Representative prior art bin indicators are disclosed in the following U.S. Patents: Mittendorf No. 1,760,204; Leilich No. 1,851,195; Mohr, Jr. et al. No. 2,704,410; Heacock No. 2,854,752; and Lanham No. 3,140,610. Additional prior art bin level indicators are: the BIN-DEX indicator manufactured by The 30/98 Company Ltd. of Horley, Surrey, England; the SILOPILOT B4B distributed by Davis Controls Ltd. of Ontario, Canada; and the SLM 10 Ultrasonic Level Monitor distributed by Western Marine Electronics, Inc. of Seattle, Washington.

The aforementioned prior art indicators, with the exception of the sonic device referred to above, employ some form of a weight which is periodically raised and lowered. When such weight contacts the surface of the material in the bin, the weight comes to rest, i.e., it is supported by the material, the level of which is to be measured. Suitable indicator means, usually including some form of visual indicator, are provided to indicate the level of material, such indicator means being responsive to the distance the weight moves downwardly from a reference plane until resting on the surface of the material.

Such prior art indicators suffer from a number of disadvantages. For the most part, these indicators are rather complicated and are therefore expensive and difficult to maintain in proper working order under the conditions to which such indicators are subjected. As known to those skilled in the art, in many applications these indicators must operate in conditions of extremely high dust levels as well as high temperatures.

Sonic bin level indicators, as represented by the above mentioned Ultrasonic Level Monitor, have also been used in the prior art. In such an indicator, a sound wave is sent down into the bin where it bounces off the material; a sensor picks up the return sound wave. The time interval between propagation of the sound wave and its return indicates the level of material in the bin. Such sonic indicators have been found to be rather unreliable due to the conditions of high dust level, moisture and temperature found in bins of the type under consideration.

Another form of prior art indicator apparatus operates on a capacitance principle. In such an apparatus, a rod (or tube, or wire) extends vertically along the inside wall of the bin for substantially the entire height thereof. Such rod in effect acts as a variable capacitor generating an electrical signal in response to the level of material. This type of apparatus has been found to be unsatisfactory at least due to the fact that the material in the bin often adheres to the tube thereby providing a false reading.

SUMMARY AND OBJECTS OF THE INVENTION

The present invention is related to a simple, inexpensive and reliable continuous bin level indicator which is primarily mechanical in nature and which will provide a substantially continuous indication of the level of material in the bin. With such an indicator, the operator of the equipment including such bin will be able to ascertain at any and all times the level of material in the bin thereby enabling the operator to alter, if necessary, the feed rate of material to or from the bin thereby providing for more efficient operation of such equipment.

A primary object of the present invention is the provision of a new and improved bin level indicator which is inexpensive to manufacture, easy to maintain and highly reliable in operation.

Another object of the present invention is to provide a continuous bin level indicator of the type described which includes reversible drive means for both lowering and raising of the weight.

Still another object of the present invention is the provision of a continuous bin level indicator including a reversible motor which drives a drum through a drive train including a clutch, such drum having a length of cable thereon with a weight suspended from the free end of the cable, the clutch being sensitive to the effect of the weight such that the drum is unwound for lowering the weight only when the latter is freely suspended.

Still another object of the present invention is the provision of a bin level indicator of the type just mentioned and including timing means for energizing the reversible motor thereby cyclically to lower and raise the weight, such timing means providing that the weight is moved downwardly a distance greater than the distance it is moved upwardly in any one cycle, whereby the weight will be incrementally lowered until coming into engagement or contact with the level of material in the bin.

These and other objects and advantages of the present invention will become apparent from the following specification disclosing a preferred embodiment shown in the accompanying drawings.

DESCRIPTION OF THE DRAWINGS

FIG. 1 is a vertical section, largely diagrammatic in form, taken through a bin having the present invention associated therewith;

FIG. 2 is an electrical schematic of the bin level indicator of the present invention.

DESCRIPTION OF THE PREFERRED EMBODIMENT

Figure 3:
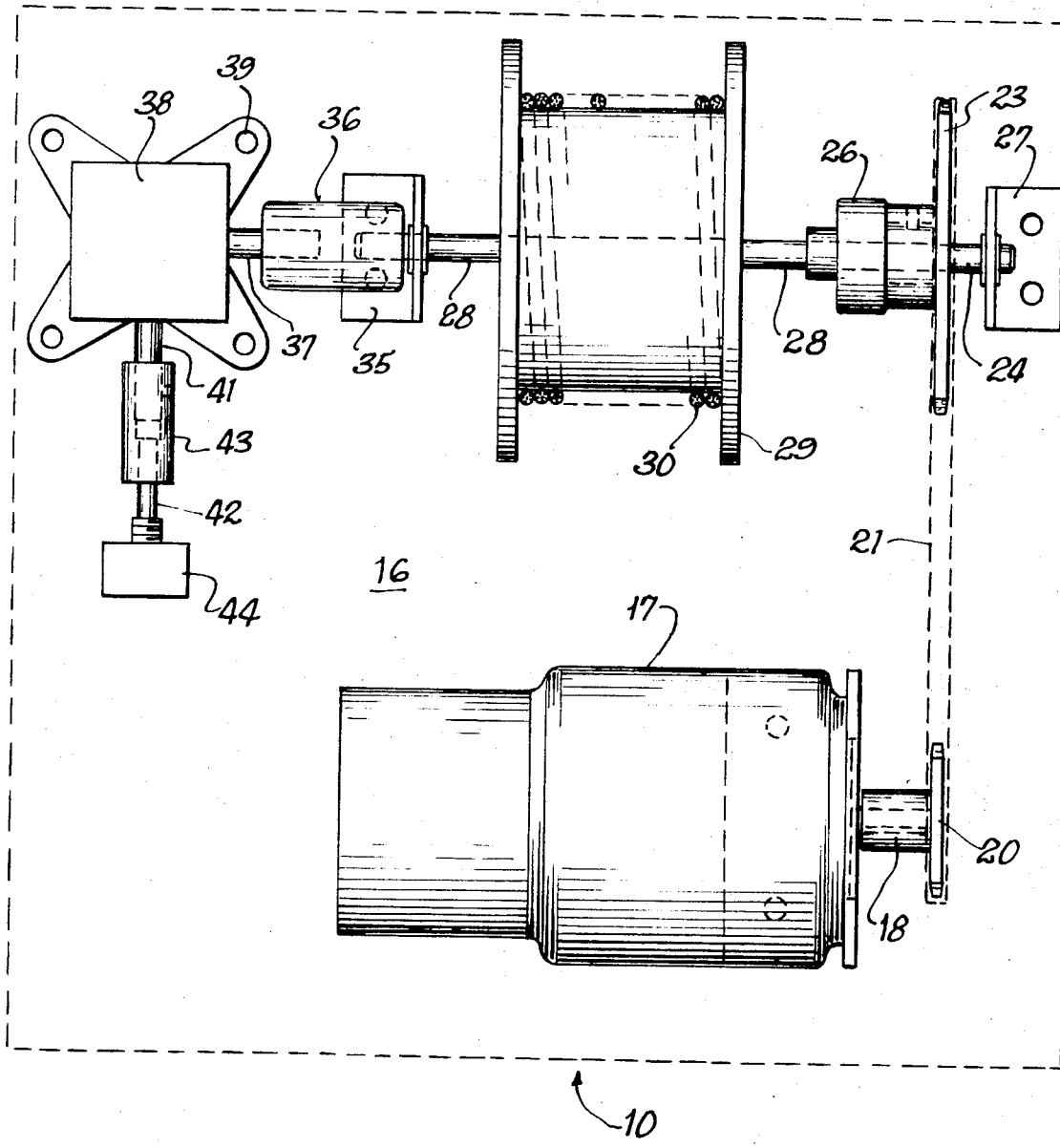
FIG. 3 is an enlarged section taken along the line 3—3 of FIG. 1.

Referring to FIG. 1, the bin level indicator of the present invention, generally designated 10, is shown associated with a bin 12, the latter being fragmentarily illustrated. It will be understood that the present invention is adapted for use with any form of a container or bin for receiving material and therefore a detailed description of such container or bin is not necessary for an understanding of the invention. By way of example, the bin 12 may form part of equipment constituting a plant for making asphalt paving material, in which case the bin 12 is adapted to contain the aggregate used in making such asphalt material.

The level of material in the bin 12 is indicated by the reference character 14. It will be understood that from time to time material will be withdrawn from the bin 12 through an outlet (not shown) and also from time to time additional material will be supplied to the bin through an inlet (not shown). It should be apparent that it is necessary for the operator of the equipment including the bin 12 to be apprised on a substantially constant basis of the level of material in the bin in order to achieve efficient operation of the asphalt making equipment. With the use of the present invention, the operator is aware of the level of material in the bin at all times during making of the asphalt material; accordingly, he will be able to operate the equipment at peak efficiency and avoid shutdowns occasioned by unintended emptying of the bin.

The bin level indicator 10 includes a housing or frame 15 mounted on the top of the bin 12, which housing includes a floor 16. Referring now to FIG. 3, the floor 16 mounts a reversible electric motor 17, which may be a Slo-Syn synchronous stepping motor; this motor has a shaft 18 mounting a sprocket wheel 20, the latter being engaged with a chain 21. A unidirectional electric motor with a suitable reversible transmission could be provided instead of the motor 17. Further, fluid operated motors with appropriate electric controls could also be provided.

The chain 21 engages a sprocket wheel 23 which is adapted to drive a shaft 24 forming part of a clutch 26. One end of the shaft 24 is suitably journaled from a bracket plate 27, the latter being supported on the floor of the housing 16. The clutch 26 is associated with a shaft 28 mounting a drum 29. A length of cable 30 is wound on the drum 29; this cable extends downwardly through an opening (not shown) in the floor 16 of the housing 15 and through an opening 32 in the top of the bin for suspending a weight 34.

The end of the shaft 28 which is remote from the clutch 26 is suitably journaled in a bracket plate 35, which bracket plate is supported from the floor 16. This end of the shaft 28 is connected with a coupling 36 which engages an input shaft 37 of a gear reducer 38, the latter including a plurality of feet 39 for mounting of the gear reducer from the floor 16. This gear reducer has an output shaft 41 connected to another shaft 42 by means of a coupling 43. The shaft 42 is connected with a potentiometer 44 for actuating the movable element thereof in response to rotation of the shaft 42.

At this time it should be mentioned that the clutch 26, which may be a cam clutch, is sensitive to the effect of the weight 34 on the cable 30 which in turn applies a torque force to the shaft 28. That is to say, the clutch 26 will transmit rotation from the shaft 24 to the shaft 28 for rotating the drum 29 in an unwinding direction only when the weight 34 is freely suspended. Therefore, when the weight 34 contacts the level of material in the bin 12 as the weight is being lowered, the clutch acts to disengage the drive between the shafts 24 and 28. However, the clutch 26 will always act to transmit rotation from the shaft 24 to the shaft 28 when the former is driven in a direction for winding of the cable on the drum 29.

Referring to the electrical schematic shown in FIG. 2, the two lines of a suitable source of electrical current are indicated by the reference characters 46 and 47. An electrically operated timer 48 is mechanically connected to a contact 49 for cyclically moving the latter for alternate engagement with fixed contacts 50 and 51. the contacts 50 and 51 are connected, respectively, with the up and down or forward and reverse windings 52, 53 of the reversible electric motor 17.

The timer 48 may be of any suitable construction. According to the present invention, the timer is set so that the movable contact 49 remains in engagement with the "down" contact 51 for a period of time which is greater than the period of time the movable contact 49 is in engagement with the "up" contact 50. In a preferred embodiment of the invention, the timer 48 is set to energize the motor 17 for 8 seconds in a down direction, i.e., a direction for unwinding the cable from the drum 29, and for 4 seconds in the reverse or up direction. Accordingly, this setting of the timer 17 provides five up and down cycles per minute.

The potentiometer 44 is connected between the lines 46, 47 in series with a resistor 55. The potentiometer 44 is connected with a suitable indicating device 56 through a "span adjustment" potentiometer 57 and a "zero adjustment" potentiometer 58, the latter being connected between the lines 46, 47 in series with a resistor 59. It will be understood that the movable element 44a of the potentiometer 44 will establish an electrical resistance in response to rotation of the shaft 42 (which shaft is responsive to rotation of the drum) to provide a corresponding indication or reading of the indicator needle 56a of the indicator 56.

The potentiometers 57 and 58 are provided to facilitate adjustment of the indicating system to accommodate the limits of material movement in a particular bin. For example, with the cable 30 unwound to an extent permitting the weight 34 to engage the bottom of the bin, the potentiometer 58 is then manually adjusted so that the indicator needle 56a will indicate a zero reading. When the bin 12 is full and when the cable 30 has been unwound such that the weight 34 engages the level of material, the potentiometer 57 is adjusted so that the needle 56a indicates a full or maximum reading.

For purposes of illustrating the operation of the present invention, but not for limiting the invention in any way, assume that the drum 29 is rotated in both up and down directions at 18 r.p.m. Assume further that one revolution of the drum pays out or winds up, as the case may be, 1 foot of cable. Accordingly, the weight 34 will be moved in both up and down directions at the rate of 18 feet per minute. With the 4 and 8 seconds of up and down movement, respectively, provided by the timer 48 as explained above, it will be apparent that the weight 34 will be moved downwardly 2.4 feet and upwardly 1.2 feet during each up and down cycle. The operation of the invention will now be explained.

Assume that the material in the bin 12 is at the level indicated in FIG. 1 and assume that substantially all of the cable 30 is wound on the drum 29 in which case the weight 34 will occupy its uppermost position. Electrical power is applied to the system energizing both the motor 17 and the timer 48 (the timer and motor operate continuously as long as electrical power is applied). The weight 34 will be repeatedly moved through its up and down cycles. Since the weight 34 is moved downwardly in each cycle twice the distance it is moved upwardly, the weight 34 will be cyclically or incrementally lowered until it engages the level of material in the bin. When this occurs, the weight will remove tension on the cable 30 and this in turn will cause the clutch 26 to come into play to prevent further unwinding of the cable. It should be apparent that the movable element 44a of the indicating potentiometer 44 will in effect follow or respond to rotation of the drum 29. Assuming that the level of material remains constant in the bin 12, it will be understood that the weight 34 will be cyclically moved upwardly and downwardly 1.2 feet into and out of supporting engagement with the material in the bin. This constant, but rather small movement of the weight 34 and corresponding rotation of the drum 29, will cause corresponding movement of the indicator needle 56a. This movement of the indicator needle is rather small with respect to the maximum movement of the indicator needle and provides a reasonably accurate indication of the level of material in the bin 12.

It will be understood that should the level of material in the bin 12 drop to a lower level, the weight 34 will seek or find this lower level and again activate the clutch 26 to arrest movement of the drum 29 in an unwinding direction and thereby provide an indication in the device 56 of the new or lower level of the bin. Correspondingly, should the level of material in the bin 12 be raised, the weight 34 will be cyclically or repeatedly moved upwardly 1.2 feet in each cycle indicating the increase in the level of material in the bin 12. Since the level of material in the bin 12 does not change at a rapid rate, and since the weight 34 moves through five up and down cycles per minute, a substantially accurate level of the material in the bin will be provided at all times including the times when the level of material is being raised and lowered.

It should be apparent that the present invention provides a new and improved bin level indicator which is simple in construction and highly reliable in operation. The timer 48 energizes the motor 17 for cyclical operation in up and down directions, the period of operation in the down direction being greater than the period of time of operation in the up direction. This operation of the motor 17 imparts corresponding rotation to the sprocket wheel 23 and shaft 24, the latter serving as the input for the clutch 26 which may be considered as a slip clutch or overrunning clutch. The clutch 26 transmits rotation from the shaft 24 to the shaft 28 at all times when the shaft 24 is being rotated in the up direction; however, the clutch 26 transmits rotation from the shaft 24 to the shaft 28 when the former is being rotated in the down direction only at such times when the weight 34 is freely suspended. When the weight engages the material, tension is reduced on the cable which in turn relieves the torque force on the shaft 28 and causes the clutch 26 to slip or overrun thereby defining, in effect, a lost-motion operation. The mechanism of the present invention causes the weight 34 to be lowered incrementally so as to seek or find the level of material in the bin and will provide a substantially continuous indication of the level of material at all times.

We claim:

1. Apparatus for indicating the level of material in a bin or the like comprising, a weight arranged to engage and be supported by the material in the bin, means mounted adjacent the upper portion of the bin and including a cable suspending said weight, said means including power means for substantially continuously raising and lowering said weight, said means including lost-motion means associated with said power means, the lost-motion means being sensitive to the effect of said weight and including an element which moves in one direction when said weight is raised and which moves in another direction only when said weight is freely suspended by the cable, indicator means responsive to movement of said element, said means also including timing means for lowering the weight a distance greater than the distance it is raised during each cycle of movement thereof at times when the weight, at the lowermost position occupied by it during a cycle of operation, does not engage the material in the bin.

2. A continuous bin level indicator comprising:
   a. reversible drive means;
   b. a drum with a length of cable thereon and a material level engaging weight secured to the free end of the cable;
   c. said drive means including a drive train engaged with said drum for driving the latter alternately in up and down directions;
   d. a clutch forming a part of said drive train, which clutch is responsive to the effect of said weight for causing movement of said drum in its down direction only when said weight is freely suspended by said cable;
   e. indicator means connected with said drum for providing an output which is a function of movement of said drum; and
   f. said drive means including timing means cyclically operating the drive means alternately in a first direction and in a second direction to cause movement of said drum in said up and down directions, respectively, said drive means being adapted, during each of said up and down cycles, to allow said weight to move downwardly a distance greater than the distance said weight is moved upwardly during each of the up and down cycles of the weight.

3. A continuous bin level indicator comprising:
   a. a reversible drive motor;
   b. a drum with a length of cable thereon and a material level engaging weight secured to the free end of the cable;
   c. a drive train engaged with said motor and said drum for driving the latter alternately in up and down directions;
   d. a clutch forming part of said drive train, which clutch is responsive to the effect of said weight for causing movement of said drum in its down direction only when said weight is freely suspended by said cable;
   e. indicator means connected with said drum for providing an output which is a function of movement of said drum; and
   f. timing means connected with said reversible drive motor for cyclically activating the latter to operate alternately in up and down directions, said timing means being adapted to cause said motor, during each up and down cycle, to operate for a period of time in said down direction greater than the period of time in said up direction, whereby said weight is allowed to move downwardly a distance greater than the distance it is moved upwardly during each of the up and down cycles of said weight.

4. The indicator according to claim 3 wherein said indicator means includes a potentiometer.

5. The indicator according to claim 3 further defined by means constituting an electric circuit which includes said potentiometer, a visual indicator which is moved in response to movement of the movable element of said potentiometer, said circuit including adjustment means for setting the limits of movement of said visual indicator with respect to the amount of movement of the movable element of said potentiometer.

6. The indicator according to claim 3 wherein said drive motor is a reversible electric motor.

* * * * *